United States Patent
Malone et al.

(10) Patent No.: US 9,074,571 B1
(45) Date of Patent: Jul. 7, 2015

(54) VEHICLE AND METHOD OF CONTROLLING AN ENGINE AUTO-STOP AND RESTART

(71) Applicant: Ford Global Technologies, LLC, Dearborn, MI (US)

(72) Inventors: Mark Douglas Malone, Canton, MI (US); William Najib Mansur, West Bloomfield, MI (US); Tuan Ahn Be, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 14/108,957

(22) Filed: Dec. 17, 2013

(51) Int. Cl.
| | |
|---|---|
| *G06G 7/78* | (2006.01) |
| *F02N 11/08* | (2006.01) |
| *B60W 10/06* | (2006.01) |
| *B60W 10/11* | (2012.01) |
| *B60W 10/02* | (2006.01) |

(52) U.S. Cl.
CPC ........... *F02N 11/0822* (2013.01); *B60W 10/06* (2013.01); *B60W 10/11* (2013.01); *B60W 10/02* (2013.01)

(58) Field of Classification Search
None
See application file for complete search history.

(56) References Cited

U.S. PATENT DOCUMENTS

| | | | |
|---|---|---|---|
| 6,607,255 B2 | 8/2003 | Bond, III et al. | |
| 6,964,260 B2 * | 11/2005 | Samoto et al. | 123/406.13 |
| 7,113,076 B2 * | 9/2006 | Yamamura | 340/425.5 |
| 7,537,534 B2 | 5/2009 | Janson et al. | |
| 7,725,228 B2 * | 5/2010 | Kobayashi et al. | 701/45 |
| 8,126,609 B2 * | 2/2012 | Kimura et al. | 701/29.2 |
| 2010/0010723 A1 * | 1/2010 | Taki et al. | 701/102 |
| 2011/0063099 A1 | 3/2011 | Miller et al. | |
| 2012/0226433 A1 | 9/2012 | Hasan et al. | |
| 2012/0270701 A1 | 10/2012 | Christen et al. | |
| 2014/0350809 A1 * | 11/2014 | Tamaru | 701/67 |

FOREIGN PATENT DOCUMENTS

EP 1818890 A1 * 8/2007 ............ B60W 10/18

* cited by examiner

*Primary Examiner* — Dirk Wright
(74) *Attorney, Agent, or Firm* — David B. Kelley; Brooks Kushman P.C.

(57) ABSTRACT

A vehicle includes an engine, a manual transmission having a clutch, and a controller. The controller is configured to, in response to receiving a signal indicative of a deceleration event initiated by the controller when the vehicle is operating with the clutch engaged, command the engine to shut down before an engine stall threshold to prevent a stall. A method of controlling a vehicle having an engine and a manual transmission with a clutch includes, in response to receiving a signal indicative of a deceleration event above a threshold value when the vehicle is operating with the clutch engaged, shutting down the engine before an engine stall threshold to prevent a stall.

20 Claims, 5 Drawing Sheets

VEHICLE AND METHOD OF CONTROLLING AN ENGINE AUTO-STOP AND RESTART

TECHNICAL FIELD

Various embodiments relate to stop-start enabled vehicles having a manual transmission and control thereof.

BACKGROUND

Modern vehicle architectures allow for modes of operation designed to reduce energy consumption. Hybrid technologies may be grouped into "full hybrid" and "micro-hybrid technologies." Full hybrid technologies may contain a hybrid propulsion system that utilizes at least two different sources of torque for propelling the vehicle. As one non-limiting example, a hybrid propulsion system may combine a conventional propulsion system that includes an internal combustion engine and a transmission with an electric propulsion system that includes one or more electric motors and a rechargeable energy storage device, such as a battery, that can power the electric motors or store energy to improve fuel economy over the conventional vehicle. A hybrid electric vehicle (HEV) typically provides different powertrain operating modes with the engine running or shutdown depending on the vehicle operating conditions, battery conditions, and driver's propulsion request. Hence, one of the major functions that an HEV provides is the ability to start or stop the engine during certain conditions. When the engine is running, the electric portion of the propulsion system may be used to assist the engine in providing the required vehicle propulsion. During the conditions when the engine is shutdown, the driver's propulsion request can be provided entirely by the electric motor, independent of the internal combustion engine.

Micro-hybrid technologies may contain Integrated Starter Generator (ISG) machines that are not capable of propelling the vehicle but are capable of supporting a rapid start of the engine as well as on/off operation of the engine while the vehicle is stationary. Thus, using micro-hybrid technologies, motor vehicles can be designed to employ certain aspects of HEV technology to reduce fuel consumption, but without use of a hybrid drivetrain. In such vehicles, sometimes called micro-hybrids, shutting down the engine during conditions where the engine operates at idle speed is used to reduce fuel consumption in a conventional powertrain that includes an internal combustion engine and a transmission, but no electric machine for driving the wheels.

In conventional ISG based micro-hybrids, the ISG may be placed in series with the internal combustion engine and transmission system. The ISG takes the place of the traditional engine starter as well as the traditional alternator/generator that generates electric power for accessories and battery storage. The ISG may allow the engine to go from zero rpm to several hundred rpm in a fraction of a second, thus providing seamless start-stop capability to the driver in addition to increased fuel economy and reduced emissions.

SUMMARY

In an embodiment, a method of controlling a vehicle having an engine, a manual transmission with a clutch, a collision mitigation system, and a user interface is provided. The vehicle is decelerated in response to a first signal indicative of a potential collision event. A load on the engine is reduced by a controlled torque reduction. The engine is auto-stopped when the clutch is engaged when the engine reaches a speed at an offset above an engine stall threshold. The user interface is commanded to provide a message with directions for a user input to restart the engine in response to a second signal indicative of the potential collision event ending. The user input including shifting the transmission to neutral and activating a clutch pedal. The engine is auto-started in response to a third signal indicative of the user input.

In another embodiment, a vehicle is provided with an engine, a manual transmission having a clutch, and a controller. The controller is configured to, in response to a deceleration event initiated by the controller when the vehicle is operating with the clutch engaged, command the engine to shut down before an engine stall threshold to prevent a stall.

In yet another embodiment, a method of controlling a vehicle having an engine and a manual transmission with a clutch is provided. In response to a deceleration event above a threshold value when the vehicle is operating with the clutch engaged, the engine is commanded to shut down before an engine stall threshold to prevent a stall.

Various embodiments of the present disclosure have associated, non-limiting advantages. For example, collision mitigation systems may be used in a vehicle to detect on-coming obstacles. The vehicle controller may alter operation of the vehicle in response to detection of on-coming obstacles or other deceleration events. The vehicle may be decelerated or stopped with or without input from the driver, for example, by using vehicle braking systems and/or deceleration of the powertrain and prime movers. When the vehicle has a manual transmission or a similar driveline where the engine torque is directly or significantly coupled to the wheel torque, the engine may stall as the vehicle approaches zero wheel speed. If the engine stalls, a manual re-key, or turning over the ignition key, may be required to crank and restart the engine. The engine of the stop-start enabled vehicle is therefore stopped in response to activation of the collision mitigation system when engine stall is imminent to prevent the engine from stalling. The engine may then be restarted without a manual re-key as the engine did not stall. Also, by stopping the engine before a stall, the likelihood that the engine stalls is reduced.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

Figure 1:
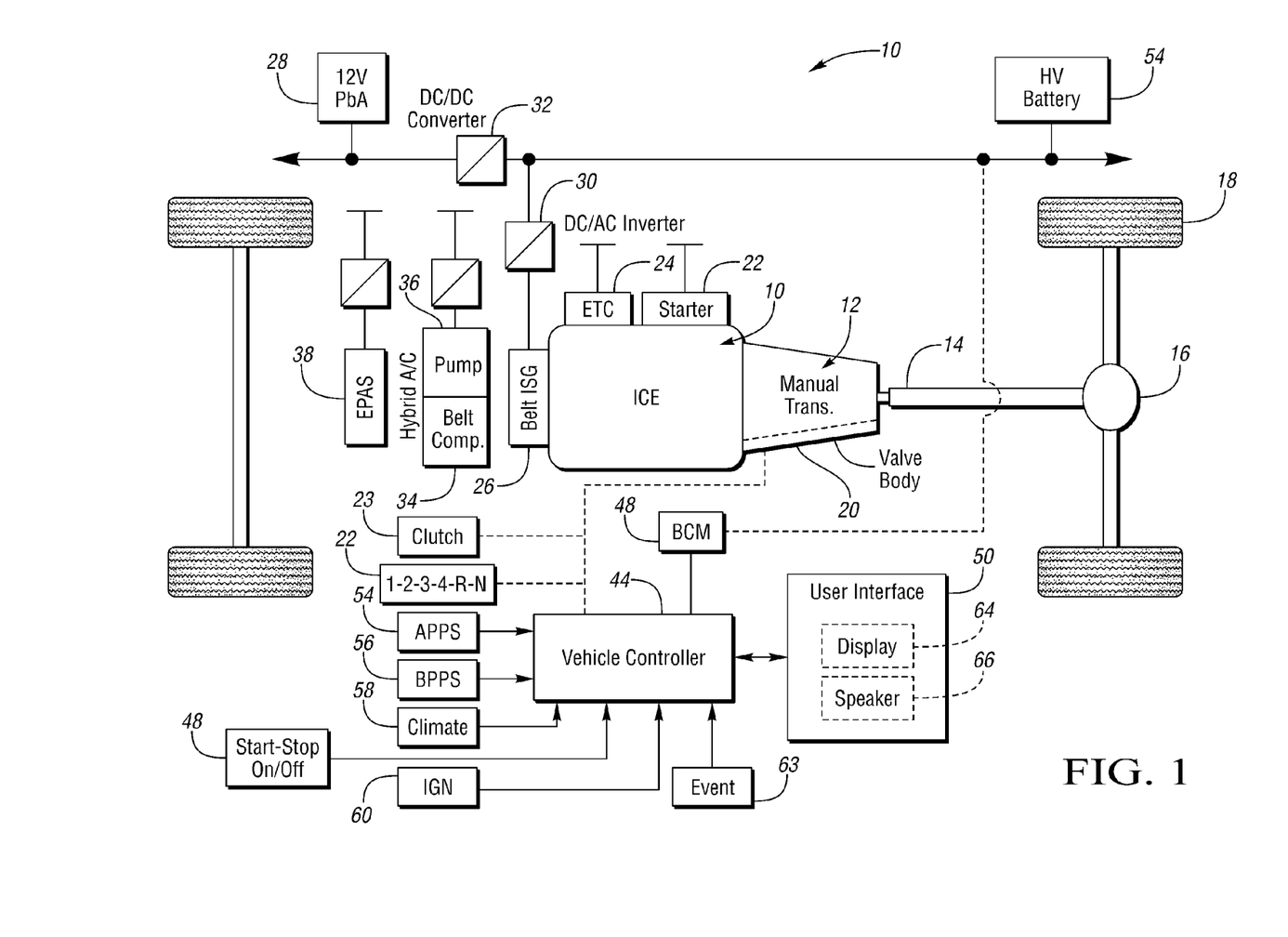
FIG. 1 is a schematic of a stop start vehicle according to an embodiment.

FIG. 1 illustrates a schematic diagram of a vehicle 10 according to an embodiment. FIG. 1 illustrates representative relationships among the components. Physical placement and orientation of the components within the vehicle may vary. Various embodiment of the present disclosure may also be implemented on other hybrid or micro-hybrid vehicles. For example, a hybrid vehicle having a manual transmission gearbox may be used. An example of a hybrid vehicle capable of implementing the described disclosure when configured with a manual transmission is described in U.S. Pat. No. 7,537,534 BB, issued on May 26, 2009 and incorporated by reference in its entirety herein. In other examples, the disclosure may be implemented with other hybrid vehicle architectures as are known in the art and using a manual transmission.

FIG. 1 schematically illustrates a vehicle 10 including an internal combustion engine 12 and a manual transmission 14. The manual transmission 14 has a clutch and gearing as is known in the art. Torque delivered from a crankshaft of the internal combustion engine 12 is delivered through the clutch and gearing of the transmission 14 to a driveshaft 16 and to a final drive differential-and-axle assembly 18 for traction wheels 20. The gearing for the transmission 14 may establish multiple torque ratios using a gear shift lever 22. Shifting between the ratios is conducted by opening the main clutch of the transmission 14 by engaging a clutch pedal 23, selecting a new gear ratio using the gear shift lever 22, and then engaging or locking the clutch in the transmission 14 in a conventional fashion by releasing the clutch pedal 23. The transmission 14 is disengaged from the crankshaft when the clutch is opened using the clutch input 23, or when the gear shift lever places the transmission in Neutral gear. The clutch pedal 23 and gear shift lever 22 may control the transmission 14 mechanically, electronically, hydraulically, and the like. The transmission 14 may also have a Park gear and a Parking brake. A starter motor 24 under the control of a low-voltage battery (not shown) can be used to start the engine 12 under cold start conditions. The vehicle 10 may also include an electronic throttle control 26 for the engine 12.

In addition, vehicle 10 may include an automatic start-stop system that automatically shuts down and restarts the engine 12 to reduce the amount of time the engine spends idling, thereby reducing fuel consumption and emissions. Automatically shutting down the engine can be most advantageous for vehicles which spend significant amounts of time waiting at traffic lights or frequently come to a stop in traffic congestion.

While the automatic start-stop feature is present in HEVs, automatic start-stop systems may also appear in vehicles that lack a hybrid electric powertrain, such as vehicle 10. The vehicle 10 may enter an auto-stop mode (i.e., the engine is auto-stopped) when certain vehicle propulsion conditions are met, such as when the driver has applied the brakes and the vehicle speed is below a predetermined speed threshold. Once the driver indicates a request for vehicle propulsion (e.g., by releasing the brake pedal), a powertrain controller may automatically restart the engine 12.

To this end, the engine 12 may be drivably connected to a crankshaft pulley, which drives a belt-driven integrated starter-generator 28 in one or more embodiments of the present application. Although a belt-drive is disclosed, other types of drives could be used to provide a driving connection between the engine 12 and the starter-generator 28. For example, a flexible chain drive or a geared drive could be used, depending on design choice. The starter-generator 28 may be electrically coupled to a voltage source, such as a low-voltage battery 30 or a high-voltage battery 32. The high-voltage battery 32 may be connected to the starter-generator 28 through a DC/AC inverter 34.

Since automobile accessories like air conditioners and water pumps have typically been designed to run off a serpentine belt on an engine, those systems need to be redesigned to function properly when the engine is turned off. In full HEVs, an electric motor is typically used to power these devices instead. In vehicle 10, hybrid vehicle accessories, such as an air conditioning compressor 36, a fuel pump 38 and a power steering pump 40, may be electrically powered by low-voltage battery 30. The voltage sources may be separated by a DC/DC converter 42, which may adjust, or "step down" the voltage level to allow the high-voltage battery 32 to charge the low-voltage battery 30.

A vehicle control system, shown generally as a vehicle controller 44, may be provided to control various components and subsystems of the vehicle 10, including the automatic start-stop system. The vehicle controller 44 may be a general vehicle controller, such as a vehicle system controller (VSC). Although it is shown as a single controller, the vehicle controller 44 may include multiple controllers or may include multiple software components or modules embedded in a single controller to control various vehicle systems, sub-systems and components. For instance, the vehicle controller 44 may include the powertrain controller to control various aspects of the micro-hybrid powertrain. The powertrain controller could be a separate hardware device, or may include a separate powertrain control module (PCM), which could be software embedded within a general purpose controller, such as the VSC. The vehicle controller 44 may generally include any number of microprocessors, ASICs, ICs, memory (e.g., FLASH, ROM, RAM, EPROM and/or EEPROM) and software code to co-act with one another to perform a series of operations.

The vehicle controller 44 may communicate with other controllers over a vehicle-wide network, such as a controller area network (CAN). The CAN may be a hardline vehicle connection (e.g., bus) and may be implemented using any number of communication protocols. For example, the vehicle controller 44 may communicate with a transmission control unit (TCU) 46 and a battery control module (BCM) 48, which is electrically coupled to the high-voltage battery 32. Alternatively, the aforementioned controllers may be software control modules contained within the vehicle controller 44 or other general purpose controllers residing on the vehicle. Some or all of these various controllers or software control modules can make up a control system in accordance with the present application. It will be appreciated, however, that various aspects of the disclosed subject matter are not limited to any particular type or configuration of the vehicle controller 44, or to any specific control logic for managing operation of the micro-hybrid powertrain or other vehicle systems.

The vehicle controller 44 may communicate with each individual vehicle system to monitor and control vehicle operation according to programmed algorithms and control logic. In this regard, the vehicle controller 44 may help manage the different energy sources available and the engine status in order to optimize fuel economy and/or maximize the vehicle's range. The vehicle controller 44 may include a programmable digital computer and suitable input/output circuitry or the like that is configured to receive the various input signals indicative of a condition of the vehicle system components. The input signals may be communicated from the vehicle system components themselves, or device-specific controllers, or may be received from various vehicle system sensors, antennas, or manual inputs, such as those described above. The vehicle controller 44 may process these input signals and others according to logic rules to monitor and control operation of the micro-hybrid powertrain.

The controller 44 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 44 may communicate signals to and/or from engine 12, transmission 14, ISG 28, and starter 24. Although not explicitly illustrated, those of ordinary skill in the art will recognize various functions or components that may be controlled by controller 44 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, and the like. Sensors communicating input through the I/O interface may be used to indicate crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear or ratio, transmission oil temperature (TOT), for example.

In addition to the foregoing, the vehicle 10 may include a user interface 50 to facilitate communications with a driver. The user interface may communicate with the vehicle controller 44 and may provide relevant vehicle content to the driver. The vehicle controller 44 may be configured to receive input signals that are indicative of current operating and/or environmental conditions of the vehicle 10, including signals relevant to the operation of the automatic start-stop system. For instance, the vehicle controller 44 may receive input signals from the BCM 48, as well as a gear selector lever 22, a clutch pedal 23, an accelerator pedal position sensor (APPS) 54, a brake pedal position sensor (BPPS) 56, a climate control module 58, an ignition switch (IGN) 60, an automatic start-stop switch 62, a vehicle event detection system 63, or the like.

The vehicle event system 63 provides a signal to the controller 44 regarding a vehicle event that is occurring or that may occur. The system 63 may include a collision mitigation system and provide a signal indicative of a possible collision event that is detected or predicted by the system 63. The collision mitigation system may include various sensors to oncoming obstacles, and may include RADAR, LIDAR, cameras, etc. An example of a collision warning system for collision warning, countermeasure, and avoidance is described in U.S. Pat. No. 6,607,255 B2 issued on Aug. 19, 2003 and incorporated by reference in its entirety herein. A system and method for detecting a vehicle event is described in U.S. patent application Ser. No. 12/992,434 filed on Nov. 12, 2010 and published on Mar. 17, 2011 as U.S. Pub. No. 2011/0063099 A1, and incorporated by reference in its entirety herein. Of course, these are examples of methods and system that the controller 44 and vehicle 10 may implement to receive information and detect a possible vehicle event or collision event, and other systems and methods may also be implemented. The vehicle event system may also include accelerometers or other sensors, or be on communication with the BPPS or a parking brake mechanism, to detect vehicle decelerations that may be above a threshold value.

The automatic start-stop switch 62 can allow the driver to manually deactivate the automatic start-stop system, thereby preventing engine auto-stops at the driver's request. The vehicle controller 44 may provide output to the user interface 50 such that the user interface 50 conveys vehicle operating information, such as information relating to the operation of the automatic start-stop system, to the driver. As will be described below, the user interface 50 may communicate relevant vehicle information to a driver visually through a display 64 and/or audibly via a speaker 66.

The display 64 may be electrically connected to a display controller (not shown). The display controller may communicate with the powertrain controller, the BCM 48, and other dedicated or general purpose controllers, such as the vehicle controller 44. The display controller may gather data from various vehicle systems and components, which may be accessed via the CAN. Moreover, the display controller may provide data to the display 64 for conveying vehicle operation information to the driver in a meaningful manner. Signals output from the various vehicle systems and components may be processed, and display computations may be carried out, in the vehicle controller 44, the display controller or the display 64, or some combination thereof. The display controller may be a separate controller or may be integrated with the vehicle controller 44 or another general or dedicated vehicle controller. Thus, as with the powertrain controller, all monitoring, processing and control operations that may be performed by a separate display controller may be described herein as being carried out by the vehicle controller 44.

Although illustrated and described in the context of the vehicle 10, which is a micro-hybrid vehicle, it is understood that embodiments of the present application may be implemented on other types of vehicles having different powertrain topologies capable of operating in an energy conserving mode. Some examples include full hybrid electric vehicles, plug-in electric vehicles, and vehicles with conventional powertrains powered by an internal combustion engine alone. For instance, full HEVs may include energy conserving modes that allow an idling engine to be turned off, similar to micro-hybrids, as well as an electric vehicle (EV) mode in which an electric motor alone is used for vehicle propulsion.

Energy conserving modes on vehicles equipped with conventional powertrains may involve engine features such as variable displacement, lowered RPM idle control, or the like. Thus, as used herein, an energy conserving mode may generally refer to any vehicle operating mode intended to reduce energy consumption for the purposes of increasing fuel economy, increasing vehicle range, reducing emissions, or the like, including any combination thereof.

According to one or more embodiments of the present application, the user interface 50 may be used to convey information concerning the operation and status of the vehicle, such as the auto-stop mode on a vehicle equipped with an automatic start-stop system. This information may be communicated in the form of on-demand messages, pop-up alerts, tell-tales, or the like. In particular, the user interface 50 may communicate messages indicating what caused the engine 12 to auto-stop, what is preventing the engine 12 from auto-stopping or what has caused the engine 12 to restart during an auto-stop event. The user interface 50 may communicate visually or audibly. The user interface may also include instructions for the driver as to starting the engine after a vehicle event signal 63 is received that causes the engine 12 to auto-stop.

During vehicle operation, the engine 12 may stall, or cease to operate abruptly, based on a number of engine operating factors, including a sudden increase in load on the engine that may be cause by an engaged clutch in the manual transmission 14 and a reduced torque or negative torque at the wheels. An engine stall may provide a vehicle disturbance to the driver, increase wear on the engine and/or driveline, impact emissions, etc. When the vehicle is in motion with the clutch in the manual transmission 14 engaged and the manual transmission in gear, the engine 12 is operating at or above an idle speed. When the wheels 20 decrease in speed or stop and the state of the transmission 14 has not changed, a load is placed on the engine 12, as the engine 12 speed is mechanically connected to the wheel speed. The engine 12 may stall. For a vehicle with a manual transmission 14, the driver then engages the clutch pedal 23 to release the transmission 14 clutch, activates the ignition key 60 to start the engine 12, and then can release the clutch pedal 23 depending on the gear selection in the transmission 14.

The vehicle controller 44 may alter operation of the vehicle 10 in response to detection of on-coming obstacles based on a signal from a collision mitigation system 63, and the vehicle may be decelerated or stopped without input from the driver, for example, by using vehicle braking systems and/or deceleration of the engine 12. The engine 12 torque is directly or significantly coupled to the wheel torque through the manual transmission 14, and the engine 12 may stall as the vehicle approaches zero wheel speed if not other action is taken. To prevent the engine from stalling, the engine is stopped using the stop-start function for the vehicle 10 in response to activation of the collision mitigation system when engine stall is imminent, or in response to a vehicle deceleration event above a threshold value in other examples. The engine 12 may then be restarted without activation of the ignition key as the engine did not stall, and may be restarted using one or more commands from the driver. The controller 44 uses stop-start control and the collision mitigation system to turn off the engine to control engine speed descent in such a manner that a stall is avoided.

During an Auto-stop, the controller 44 commands the engine 12 to shut down by reducing the engine speed to zero in an orderly and controlled manner such that it is ready for an Auto-start. In one example, the Auto-start is a direct start and the controller 44 controls the position of the pistons within the engine such that a direct start by fueling and ignition in the appropriate cylinder causes the engine to start. In another example, the starter motor may be used to initiate rotation of the engine until combustion within the engine cylinders is able to maintain an engine speed above an idle speed.

Therefore, the engine 12 may be automatically stopped via a method as described below and in a way that may be familiar or predictable to the driver, for example, by using the Stop-Start function to Auto-Stop the engine 12 as the speed of the engine 12 decreases and/or as engine loading approaches stall thresholds to prevent an engine stall. The method may Auto-stop the engine 12 in response to receiving a signal indicative of a potential obstacle, for example using the collision mitigation system and before an engine stall would occur. During Auto-stop, engine 12 operation is stopped in a controlled manner, for example, by stopping spark ignition and fuel flow, while the ignition key remains on.

In one example, the method may receive a signal from the system 63 that a vehicle event is in progress, such as an approaching potential obstacle. When mitigation, such as braking or vehicle deceleration, is in progress, the controller 44 may command the engine to Auto-stop as a vehicle state passes below a threshold value. The threshold value may be a function of engine speed, vehicle speed, powertrain loading, engine load, time after mitigation event signal initially received, time to reach a targeted vehicle speed, time to reach a target engine speed or load, and/or combination of parameters designed to indicate the approach of impending engine stall. The threshold value may be a predetermined value, and may be in a calibration or other table accessible by the controller 44. Alternatively, the controller 44 may determine the threshold value from a function or series of functions in real-time.

When the driver and/or vehicle is ready to resume operation, no activation of the ignition key may be required to restart the engine, as an engine stall has not occurred. The driver provides an input to the vehicle using the control interfaces (e.g. brake pedal indicated by BPPS 56, clutch via pedal 23, and/or accelerator pedal indicated by APPS 54) in a manner compatible with the Stop-Start function to automatically restart the engine. The method reduces engine 12 stalls, and provides for restarting the engine without use of the ignition key. The engine may be restarted or Auto-started in a manner that is predictable to the driver and meets driver expectations for a Stop-Start vehicle such as a micro-hybrid or an HEV.

Figure 2:
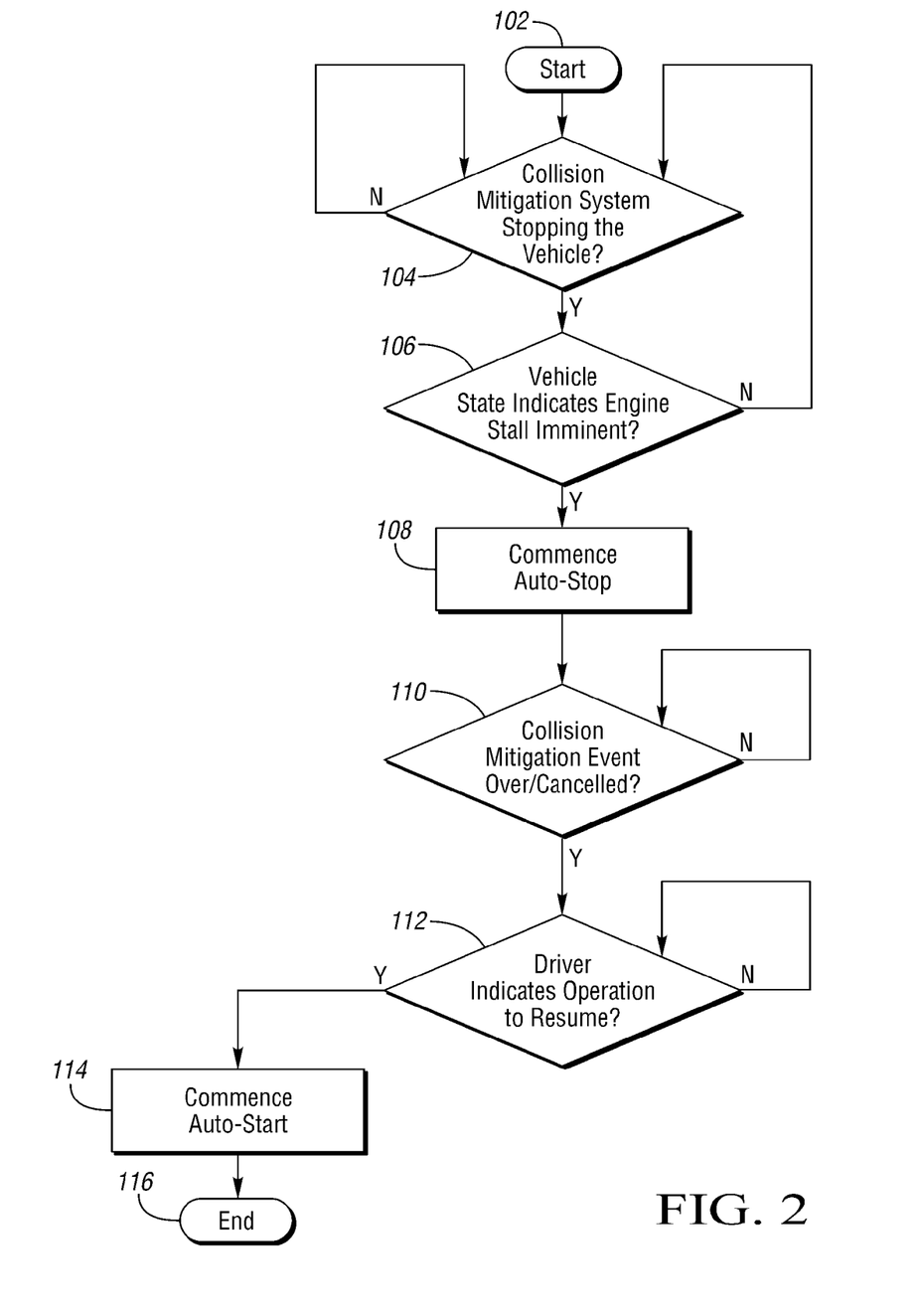
FIG. 2 is a flow chart illustrating a method of controlling a stop start vehicle according to an embodiment.

FIG. 2 illustrates a method 100 of controlling the vehicle 10 according to an embodiment. Various steps in the flow chart may be rearranged or omitted, and other steps may be added within the spirit and scope of the disclosure. The method 100 may also be applied to other hybrid vehicle architectures as are known in the art. The method 100 provides for Auto-stopping the engine to prevent an engine stall in response to a vehicle event, such as a collision mitigation event. The method 100 also provides for Auto-starting the engine 12.

The controller 44 starts the method 100 at block 102. At block 104 the controller 44 receives a signal from the system 63 indicating a deceleration event such as a potential collision event. The signal may also be indicative of another vehicle event where an engine stall may be imminent, such as a significant deceleration of the vehicle based on severe braking as indicated by the activation of the brake pedal (BPPS), activation of the parking brake, etc. The deceleration event may be initiated by the controller or the user in various examples. The deceleration event may need to be above a threshold value at block 104 in order for the method to proceed.

In response to receiving the signal at block 104, the controller 44 proceeds to block 106 and determines, based on various sensors and vehicle states, whether an engine stall is imminent. The controller 44 may determine that an engine 12 stall is imminent using an engine map including information regarding engine speed and/or engine load. The controller 44 may also use the gear ratio of the transmission 14, the BPPS 56, the vehicle speed or wheel speed, or the like. The controller 44 may use one or more of these inputs to determine if an engine stall is approaching. The controller 44 may use the trend of the data to forecast a likely stall condition. The controller 44 may reference various thresholds for each of the vehicle states to indicate a likely engine stall. The controller 44 may also use multiple inputs and determine that an engine 12 stall is likely when any one of them reaches their associated threshold value.

When an engine stall is indicated as approaching or imminent at block 106, the controller 44 continues to block 108. At block 108, the controller commences the Auto-stop process for the engine 12. Generally, the controller 44 acts to reduce the engine 12 load before it is brought down by the deceleration of the vehicle and connected manual transmission 14. The controller 44 may reduce the engine load and Auto-stop the engine 12 in various ways. For example, the controller 44 may stop fuel flow to the engine, close the throttle, and/or reduce the torque output of the engine either by a fast torque reduction or a slow torque reduction. A fast torque reduction includes spark retard and has a faster response time than slow torque reduction. Slow torque reduction includes reducing air flow to the engine 12.

In some examples, at block 108, the controller 44 may also provide a message to the driver that the engine is being Auto-stopped based on the collision mitigation system or the like. The controller 44 may command the display 64 to provide a visual message to the driver, for example. The controller may also command the speaker 66 to provide an audible message or alert to the driver in combination with the visual message or by itself. The driver is therefore notified that the engine is being Auto-stopped and the reason it is occurring.

After the engine 12 has been Auto-stopped by the controller 44, the method proceeds to block 110. At block 110, the controller 44 monitors for the end of the collision mitigation event or vehicle event from system 63, deceleration event from BPPS, or the like. The end of the event may be indicated by another signal from the system 63 or another vehicle sensor, a flag being removed, another flag being set, the signal from the system 63 or another vehicle sensor ending, or the like. The driver may also manually cancel the event using the user interface 50. The controller 44 may be configured such that the engine 12 cannot be restarted if an obstacle is present. Block 110 may also be calibrateable such that the method proceeds to block 112 where the engine may be restarted only under certain circumstances. In some examples, block 110 may also include a time threshold where the controller 44 proceeds to block 112 after a predetermined length of time.

At block 112, the controller 44 determines if the driver has requested an engine restart. The driver may be prompted via the user interface 50 that the engine may now be restarted. For example, a message may appear on the display 64 and/or an audible message or alert may be provided via speaker 66. The visual or audible message may include one or more prompts for the driver to follow to restart the engine as an Auto-start without a re-key of the ignition. In one example, the driver sequentially shifts the transmission 14 into a Neutral gear using gear shift lever 22, and then activates the clutch pedal 23 for the controller 44 to restart the engine 12. For example, the controller 44 may provide a first message such as "Shift to Neutral to restart" followed by a second message such as "Engage Clutch to restart." The controller 44 may provide the second message only after the driver has completed the gear-shift, or after a suitable time period. In another example, the controller 44 may provide a single message such as "Shift to Neutral then Engage Clutch to restart." Of course, other sequences or driver commands may be used to restart the engine 12 without a stall event.

After the driver has requested an Auto-start of the engine 12, the controller 44 proceeds to block 114 to restart the engine 12. The method 100 then ends at block 116

Figure 3:
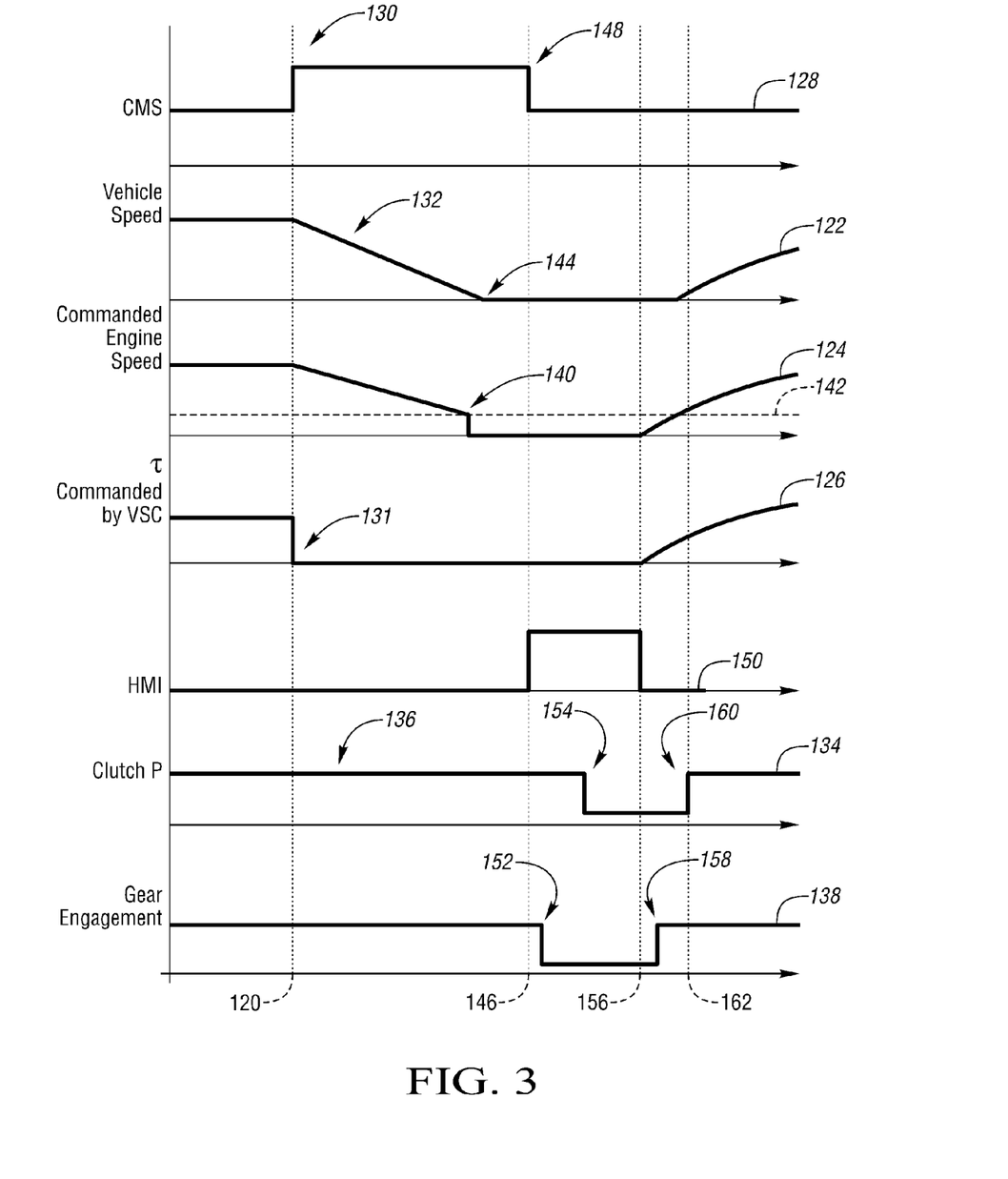
FIG. 3 is a timing chart for the stop start vehicle during a collision mitigation event according to the method of FIG. 2.
Figure 4:
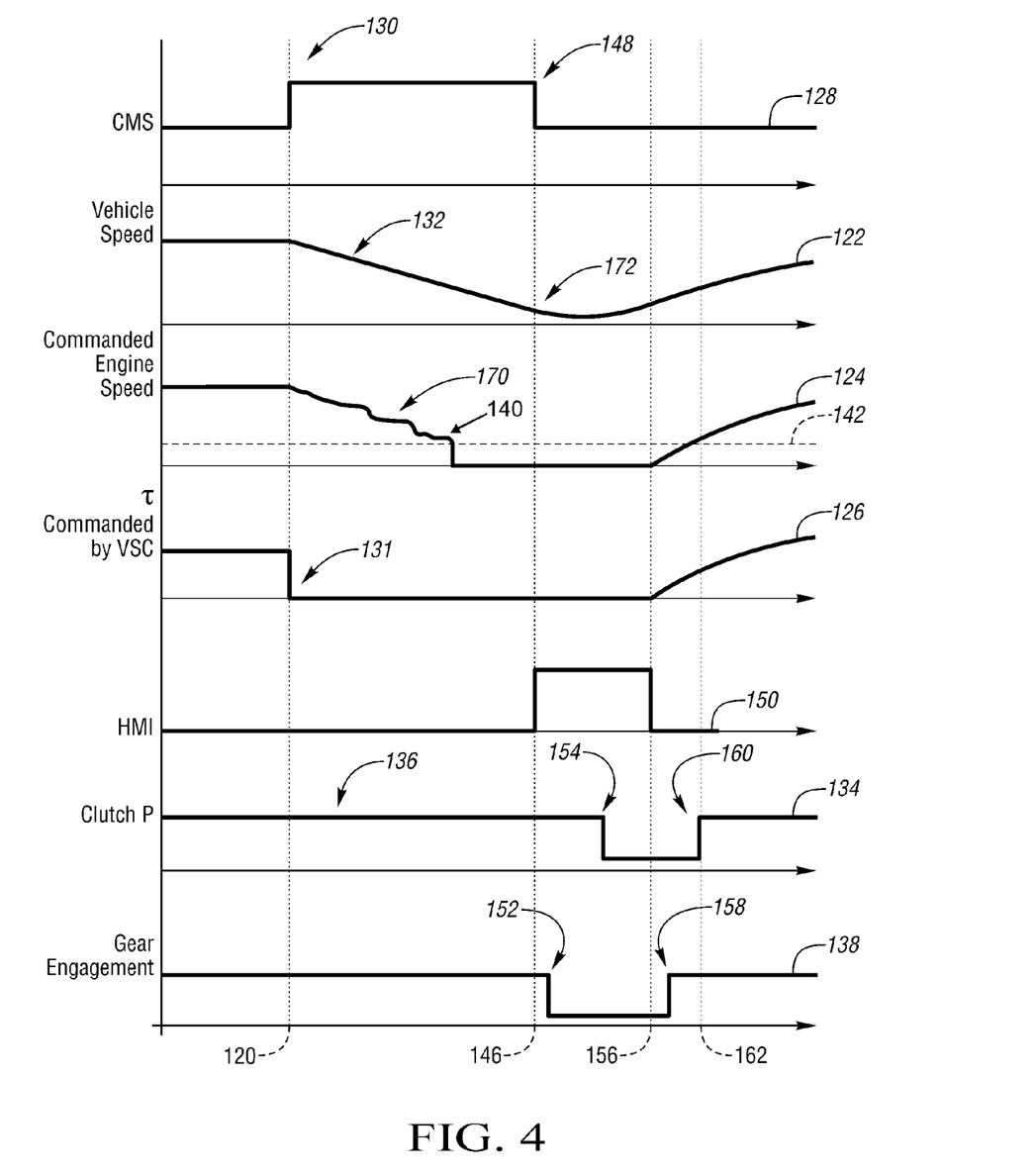
FIG. 4 is another timing chart for the stop start vehicle during a collision mitigation event according to the method of FIG. 2.
Figure 5:
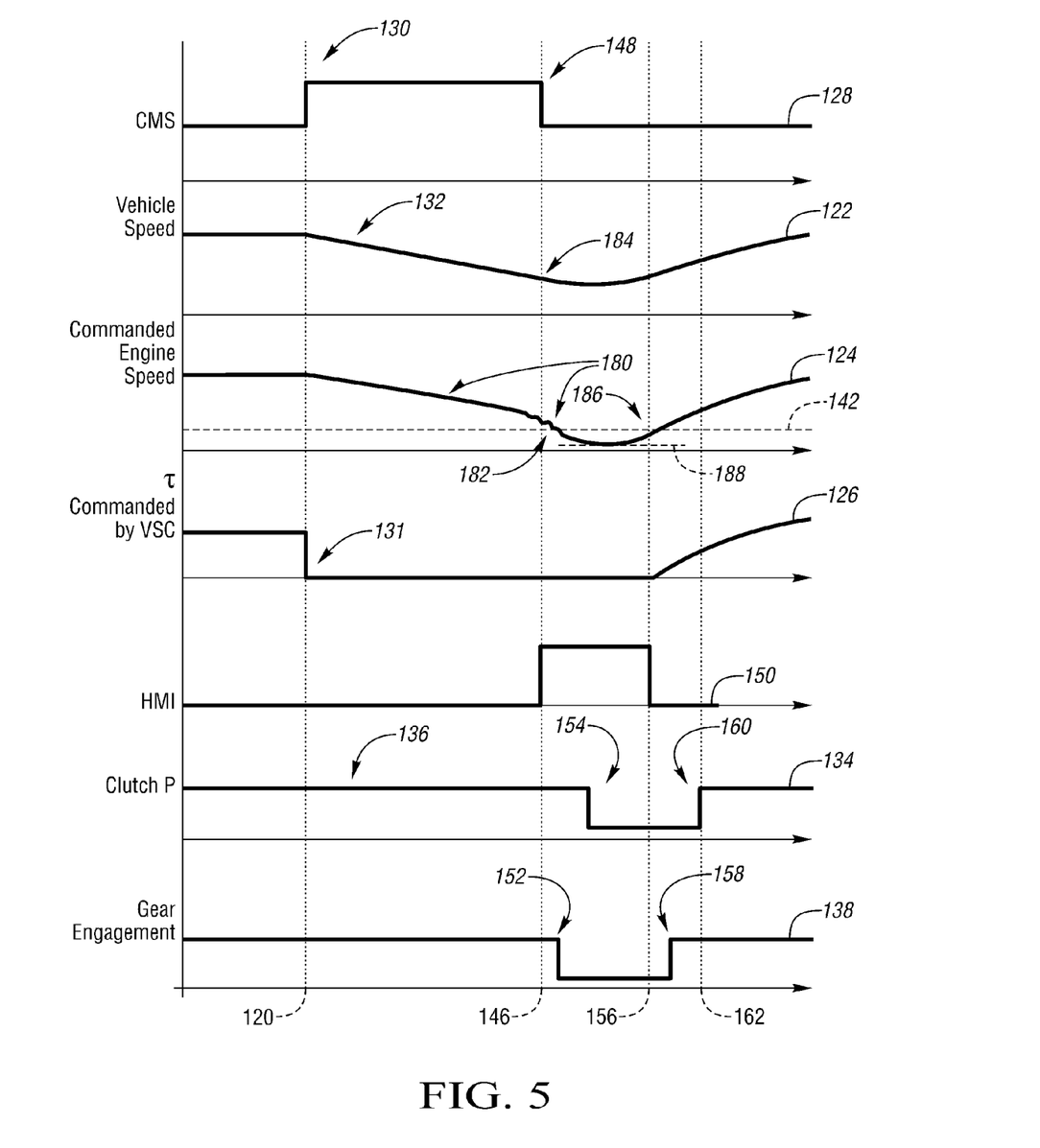
FIG. 5 is yet another timing chart for the stop start vehicle during a collision mitigation event according to the method of FIG. 2.

FIGS. 3-5 illustrate various examples of timing charts for the implementation of method 100 in vehicle 10, and similar features between the figures have common reference numbers. Figures 305 refer to the deceleration event causing the use of method 100 in terms of a collision mitigation event for simplicity; however, other deceleration events are also contemplated.

FIG. 3 illustrates a signal diagram representative of an example of the method 100 being implemented in vehicle 10. FIG. 3 illustrates an example where the vehicle speed and engine speed are at zero before the collision mitigation event, or other event prompting method 100, ends.

Before time 120, the vehicle is moving at a positive vehicle speed with the engine providing power to propel the vehicle. The vehicle speed is shown by line 122. The engine speed of rotation, or crankshaft speed, is shown by line 124. The vehicle torque output commanded by the controller 44 is shown by line 126, and at least a portion of the vehicle torque output is provided by engine 12 torque output.

At time 120, the system 63 provides a signal 128 to the controller 44 indicating a potential collision event, as shown by 130. In other embodiments, the signal 128 may be provided by a braking system or other system regarding a vehicle event causing significant deceleration, an abrupt stop of the vehicle, etc. The signal 128 may be a change in signal 128 value as shown, or may be a flag value that is set by the system 63 and/or controller 44.

In response to the signal 130, the controller 44 commands zero torque output from the engine 12 and any electric machines as shown by the abrupt decrease in commanded torque output 126 at 131. The engine torque output may be reduced by (i) stopping fuel flow or injection into the engine 12, (ii) closing the throttle, and/or (iii) torque reduction via fast path and/or slow path. The controller 44 may use these torque reduction techniques alone or in combination, and/or apply them simultaneously or sequentially. In another example, the controller 44 may modify the abrupt decrease 131 in commanded torque to be a ramp function, multi-step function, or other torque decrease function.

The controller 44 also commands the vehicle 10 to begin decelerating as shown by the decrease in vehicle speed at 132 at time 120. The controller 44 may engage the braking system for the vehicle, or otherwise begin to command the vehicle to decelerate. The engine speed 124 decreases with the decreasing vehicle speed 122, as the controller 44 implements various torque reduction controls for the engine 12. As the clutch in the transmission is engaged, as shown by the clutch pressure 134 at 136, and the transmission is in gear (i.e. not in a Park or Neutral gear), as indicated by line 138, the engine speed 124 is mechanically linked to the vehicle speed 122.

At 140, the controller 44 determines that the engine 12 is approaching an associated stall speed 142. At or below the stall speed 142, the engine 12 may stall. Before the engine speed 124 reaches the stall speed threshold, the controller 44 commands the engine 12 to Auto-stop and commands the engine speed 124 to zero.

At 144, the vehicle 10 is stopped as the vehicle speed 122 is zero. At time 146, after the vehicle speed 144 is zero and the engine speed 124 is zero, the system 63 changes the signal 128 indicating that the potential collision event has ended, as shown by 148. In response, the controller 44 commands the user interface 50 to provide prompts or messages to the driver to Auto-start the engine 12, as shown by the user interface signal line 150.

The user interface 50 prompts the driver to first shift the transmission 14 into a Neutral gear, as shown by line 138 at 152. Then the user interface prompts the driver to engage the clutch pedal, as shown by the change in clutch pressure 134 at 154. The user interface prompting then ends, as shown by line 150. The engine starts at time 156, as shown by the increase in engine speed 124 and vehicle torque output 126. The controller 44 may need to activate a starter motor such as starter-generator 28 in order to restart the engine, as the engine speed was at zero.

The user may then shift the transmission into a gear, such as first gear, as shown by line 138 at 158, and release the clutch pedal, as shown by clutch pressure 134 at 160. The vehicle then begins to move, as shown by the increasing vehicle speed 122 at time 162.

FIG. 4 illustrates another signal diagram representative of an example of the method 100 being implemented in vehicle 10. FIG. 4 illustrates an example where the vehicle is in motion and engine speed is at zero when the collision mitigation event, or other event prompting the use of method 100, ends.

Before time 120, the vehicle is moving at a positive vehicle speed 122 with the engine providing power to propel the vehicle. At time 120, the system 63 provides a signal 128 to the controller 44 indicating a potential collision event, as shown by 130. In other embodiments, the signal 128 may be provided by a braking system or other system regarding a vehicle event causing significant deceleration, an abrupt stop of the vehicle, etc.

In response to the signal 130, the controller 44 commands zero torque output from the engine 12 and any electric machines as shown by the abrupt decrease in commanded torque output 126 at 131. The controller 44 may reduce engine torque by (i) stopping fuel flow or injection into the engine 12, (ii) closing the throttle, and/or (iii) torque reduction via fast path and/or slow path control. The controller 44 may use these torque reduction techniques alone or in combination, and/or apply them simultaneously or sequentially, as shown by the change in engine speed 124 at 170. In another example, the controller 44 may modify the abrupt decrease 131 in commanded torque to be a ramp function, multi-step function, or other torque decrease function.

The engine speed 124 decreases with the decreasing vehicle speed 122. As the clutch in the transmission is engaged, as shown by the clutch pressure 134 at 136, and the transmission is in gear (i.e. not in a Park or Neutral gear), as indicated by line 138, the engine speed 124 is mechanically linked to the vehicle speed 122.

At 140, the controller 44 determines that the engine 12 is approaching an associated stall speed 142. At or below the stall speed 142, the engine 12 may stall. Before the engine speed 124 reaches the stall speed threshold, the controller 44 commands the engine 12 to Auto-stop and commands the engine speed 124 to zero.

At time 146, the collision mitigation system 63 changes the signal 128 indicating that the potential collision event has ended, as shown by 148. The vehicle is in motion, as shown by the positive vehicle speed 122 at 172. The engine speed 124 is at zero. In response, the controller 44 commands the user interface 50 to provide prompts or messages to the driver to Auto-start the engine 12, as shown by the user interface signal line 150.

The user interface 50 prompts the driver to first shift the transmission 14 into a Neutral gear, as shown by line 138 at 152. Then the user interface prompts the driver to engage the clutch pedal, as shown by the change in clutch pressure 134 at 154. The user interface prompting then ends, as shown by line 150. The engine starts at time 156, as shown by the increase in engine speed 124 and vehicle torque output 126.

The user may then shift the transmission into a gear, such as first gear, as shown by line 138 at 158, and release the clutch pedal, as shown by clutch pressure 134 at 160. The vehicle begins to increase at time 162 as shown by the vehicle speed 122.

FIG. 5 illustrates yet another signal diagram representative of an example of the method 100 being implemented in vehicle 10. FIG. 4 illustrates an example where the vehicle is in motion and engine speed is positive when the collision mitigation event, or other event prompting the use of method 100, ends. The engine has been commanded to Auto-stop; however, the engine has not yet stopped its rotational motion.

Before time 120, the vehicle is moving at a positive vehicle speed 122 with the engine providing power to propel the vehicle. At time 120, the system 63 provides a signal 128 to the controller 44 indicating a potential collision event, as shown by 130. In other embodiments, the signal 128 may be provided by a braking system or other system regarding a vehicle event causing significant deceleration, an abrupt stop of the vehicle, etc.

In response to the signal 130, the controller 44 commands zero torque output from the engine 12 and any electric machines as shown by the abrupt decrease in commanded torque output 126 at 131. The controller 44 may reduce engine torque by (i) stopping fuel flow or injection into the engine 12, (ii) closing the throttle, and/or (iii) torque reduction via fast path and/or slow path control. The controller 44 may use these torque reduction techniques alone or in combination, and/or apply them simultaneously or sequentially, as shown by the change in engine speed 124 at 180. In another example, the controller 44 may modify the abrupt decrease 131 in commanded torque to be a ramp function, multi-step function, or other torque decrease function.

The engine speed 124 decreases with the decreasing vehicle speed 122. As the clutch in the transmission is engaged, as shown by the clutch pressure 134 at 136, and the transmission is in gear (i.e. not in a Park or Neutral gear), as indicated by line 138, the engine speed 124 is mechanically linked to the vehicle speed 122.

At 182, the controller 44 determines that the engine 12 is approaching an associated stall speed 142. At or below the stall speed 142, the engine 12 may stall. Before the engine speed 124 reaches the stall speed threshold, the controller 44 commands the engine 12 to Auto-stop.

At time 146, the system 63 changes the signal 128 indicating that the potential collision event has ended, as shown by 148. The vehicle is in motion, as shown by the positive vehicle speed 122 at 184. The engine speed 124 is above zero, as shown by 182. The engine has been Auto-stopped; however, it has not yet reached zero rotational speed. In response, the controller 44 commands the user interface 50 to provide prompts or messages to the driver to Auto-start the engine 12, as shown by the user interface signal line 150.

The user interface 50 prompts the driver to first shift the transmission 14 into a Neutral gear, as shown by line 138 at 152. Then the user interface prompts the driver to engage the clutch pedal, as shown by the change in clutch pressure 134 at 154. The user interface prompting then ends, as shown by line 150. The engine starts at time 156, as shown by the increase in engine speed 124 and vehicle torque output 126.

Note that the engine speed 124 at 186 is above zero yet below the stall threshold 142. One or more thresholds, such as threshold 188 may be used by the controller 44 to determine how to Auto-start the engine. In the example shown, the engine speed at 186 is above the threshold 188 and the engine therefore has sufficient rotational speed that the engine may be restarted by autoignition. If the engine speed is below the threshold 188, the engine may need to be restarted using a starter motor such as starter generator 28.

The user may then shift the transmission into a gear, such as first gear, as shown by line 138 at 158, and release the clutch pedal, as shown by clutch pressure 134 at 160. The vehicle begins to increase at time 162 as shown by the vehicle speed 122.

For an engine stall, noise, vibration, or harshness issues may arise as the engine is trying to maintain idle speed control until the engine abruptly stops. For restarting the engine after an engine stall, the user may cycle or turnover the ignition key, push an ignition or vehicle on/off button, or the like. The user interface may provide information to the user that the engine needs to be started based on a stall event. For Autostart, the engine restarts automatically in response to the gear being in Neutral and the clutch pedal being engaged. The user interface may provide information to the user that the vehicle has been Autostopped and the steps required to Autostart. During an engine Autostop, any noise, vibration, and harshness caused by the engine stopping may be reduced compared to an engine stall because the engine speed reduction to zero during the Autostop is controlled and coordinated with the engine controls.

Various embodiments of the present disclosure have associated, non-limiting advantages. For example, collision mitigation systems may be used in a vehicle to detect on-coming obstacles. The vehicle controller may alter operation of the vehicle in response to detection of on-coming obstacles, and the vehicle may be decelerated or stopped without input from the driver, for example, by using vehicle braking systems and/or deceleration of the powertrain and prime movers. When the vehicle has a manual transmission or a similar driveline where the engine torque is directly or significantly coupled to the wheel torque, the engine may stall as the vehicle approaches zero wheel speed. If the engine stalls, a manual re-key, or turning over the ignition key, may be required to crank and restart the engine. The engine of the stop-start enabled vehicle is therefore stopped in response to activation of the collision mitigation system when engine stall is imminent to prevent the engine from stalling. The engine may then be restarted without a manual re-key as the engine did not stall. Also, by stopping the engine before a stall, the likelihood that the engine stalls is reduced.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling a vehicle having an engine, a manual transmission with a clutch, a collision mitigation system, and a user interface, the method comprising:
   decelerating the vehicle in response to a first signal indicative of a potential collision event;
   reducing a load on the engine by a controlled torque reduction;
   auto-stopping the engine when the clutch is engaged when the engine reaches a speed at an offset above an engine stall threshold;
   commanding the user interface to provide a message with directions for a user input to restart the engine in response to a second signal indicative of the potential collision event ending, the user input including shifting the transmission to neutral and activating a clutch pedal; and
   auto-starting the engine in response to a third signal indicative of the user input.

2. The method of claim 1 further comprising receiving a fourth signal indicative of a speed of the engine; and
   auto-starting the engine in response to the third signal by operating a starter motor to rotate the engine when the engine speed is below a threshold speed value, the threshold speed value less than the engine stall threshold.

3. The method of claim 1 further comprising receiving a fourth signal indicative of a speed of the engine; and
   auto-starting the engine in response to the third signal by autoignition when the engine speed is between a threshold speed value and the engine stall threshold, the threshold speed value less than the engine stall threshold.

4. The method of claim 1 wherein the steps are conducted sequentially.

5. A vehicle comprising:
   an engine;
   a manual transmission having a clutch; and
   a controller configured to, in response to a deceleration event initiated by the controller when the vehicle is operating with the clutch engaged, command the engine to shut down before an engine stall threshold to prevent a stall.

6. The vehicle of claim 5 wherein the controller is further configured to control an on/off state of the engine while the vehicle is operating to reduce engine idle time.

7. The vehicle of claim 5 wherein the controller is further configured to, in response to the deceleration event ending and receiving a user input, restart the engine.

8. The vehicle of claim 7 further comprising a clutch pedal adapted to control a position of the clutch;
   wherein the user input is a signal indicative of activation of the clutch pedal opening the clutch of the manual transmission.

9. The vehicle of claim 7 further comprising a gear shift lever adapted to select and control a gear ratio of the transmission;

wherein the user input is a signal indicative of the gear shift lever selecting a neutral gear in the transmission.

10. The vehicle of claim 7 further comprising:
a clutch pedal adapted to control a position of the clutch; and
a gear shift lever adapted to select a gear ratio of the transmission;
wherein the user input is a signal indicative of activation of the clutch pedal opening the clutch of the manual transmission and a signal indicative of the gear shift lever selecting a neutral gear in the transmission.

11. The vehicle of claim 7 further comprising a user interface;
wherein the controller is configured to, in response to the deceleration event ending, command the user interface to provide a prompt to the user regarding the user input.

12. The vehicle of claim 5 further comprising:
a fraction battery; and
an electric machine configured to operate as a motor to propel the vehicle and as a generator to provide electrical power to charge the battery.

13. The vehicle of claim 5 further comprising a collision mitigation system, wherein the controller is configured to initiate the deceleration event in response to a possible collision event identified by the system.

14. A method of controlling a vehicle having an engine and a manual transmission with a clutch, the method comprising, in response to a deceleration event above a threshold value when the vehicle is operating with the clutch engaged, shutting down the engine before an engine stall threshold to prevent a stall.

15. The method of claim 14 further comprising, in response to the deceleration event ending and receiving a user input, restarting the engine.

16. The method of claim 15 further comprising, in response to the deceleration event ending and receiving a user input, restarting the engine using a starter motor when an engine speed is below a threshold speed value, the threshold speed value less than the engine stall threshold.

17. The method of claim 15 further comprising, in response to the deceleration event ending and receiving a user input, restarting the engine using autoignition when an engine speed is between a threshold speed value and the engine stall threshold, the threshold speed value less than the engine stall threshold.

18. The method of claim 15 wherein the user input comprises a first signal indicative of activation of a clutch pedal opening the clutch of the manual transmission and a second signal indicative of a gear shift lever placing the manual transmission in a neutral gear, wherein the first and second signals are received sequentially.

19. The method of claim 15 further comprising, in response to receiving a signal indicative of the deceleration event ending, commanding a user interface to provide a prompt to the user regarding the user input.

20. The method of claim 14 further comprising, in response to a deceleration event above a threshold value when the vehicle is operating with the clutch engaged, reducing a load on the engine by controlling at least one of fuel flow, throttle position, and engine spark.

* * * * *

UNITED STATES PATENT AND TRADEMARK OFFICE
CERTIFICATE OF CORRECTION

| | | |
|---|---|---|
| PATENT NO. | : 9,074,571 B1 | Page 1 of 1 |
| APPLICATION NO. | : 14/108957 | |
| DATED | : July 7, 2015 | |
| INVENTOR(S) | : Mark Douglas Malone et al. | |

It is certified that error appears in the above-identified patent and that said Letters Patent is hereby corrected as shown below:

On the Title Page of the Patent:

(72)    Inventors:

Delete the name of the third inventor "Tuan Ahn Be" and
Insert -- Tuan Anh Be --.

Signed and Sealed this
Twenty-eighth Day of June, 2016

Michelle K. Lee
*Director of the United States Patent and Trademark Office*